United States Patent [19]

Coots

[11] Patent Number: 4,780,985
[45] Date of Patent: Nov. 1, 1988

[54] ELECTRIC MOUSE EXTERMINATOR

[76] Inventor: Claude G. Coots, Rte. 1, Box 104, Mentone, Ala. 35984

[21] Appl. No.: 932,790

[22] Filed: Jan. 12, 1987

[51] Int. Cl.$^4$ ............................................. A01M 19/00
[52] U.S. Cl. ....................................................... 43/98
[58] Field of Search ..................................... 43/98, 112

[56] References Cited

U.S. PATENT DOCUMENTS

| 1,899,199 | 2/1933 | Kaiser | 43/98 |
| 2,420,723 | 5/1947 | Ratchford | 43/98 |
| 4,074,456 | 2/1978 | Tidwell | 43/98 |
| 4,497,130 | 2/1985 | Fitzgerald | 43/98 |

FOREIGN PATENT DOCUMENTS 338762 7/1921 Fed. Rep. of Germany .

Primary Examiner—Nicholas P. Godici
Assistant Examiner—Carmine Cuda
Attorney, Agent, or Firm—Jay M. Cantor

[57] ABSTRACT

The disclosure relates to a rodent exterminator wherein a box includes electrical wires at opposite sides of an entry opening thereinto with a hinged top for disconnectably providing power to the wires and permitting easy removal of an exterminated rodent with rapid availability for reuse. The box includes air vents in one side to permit the aroma of bait therein to permeate external to the box.

8 Claims, 1 Drawing Sheet

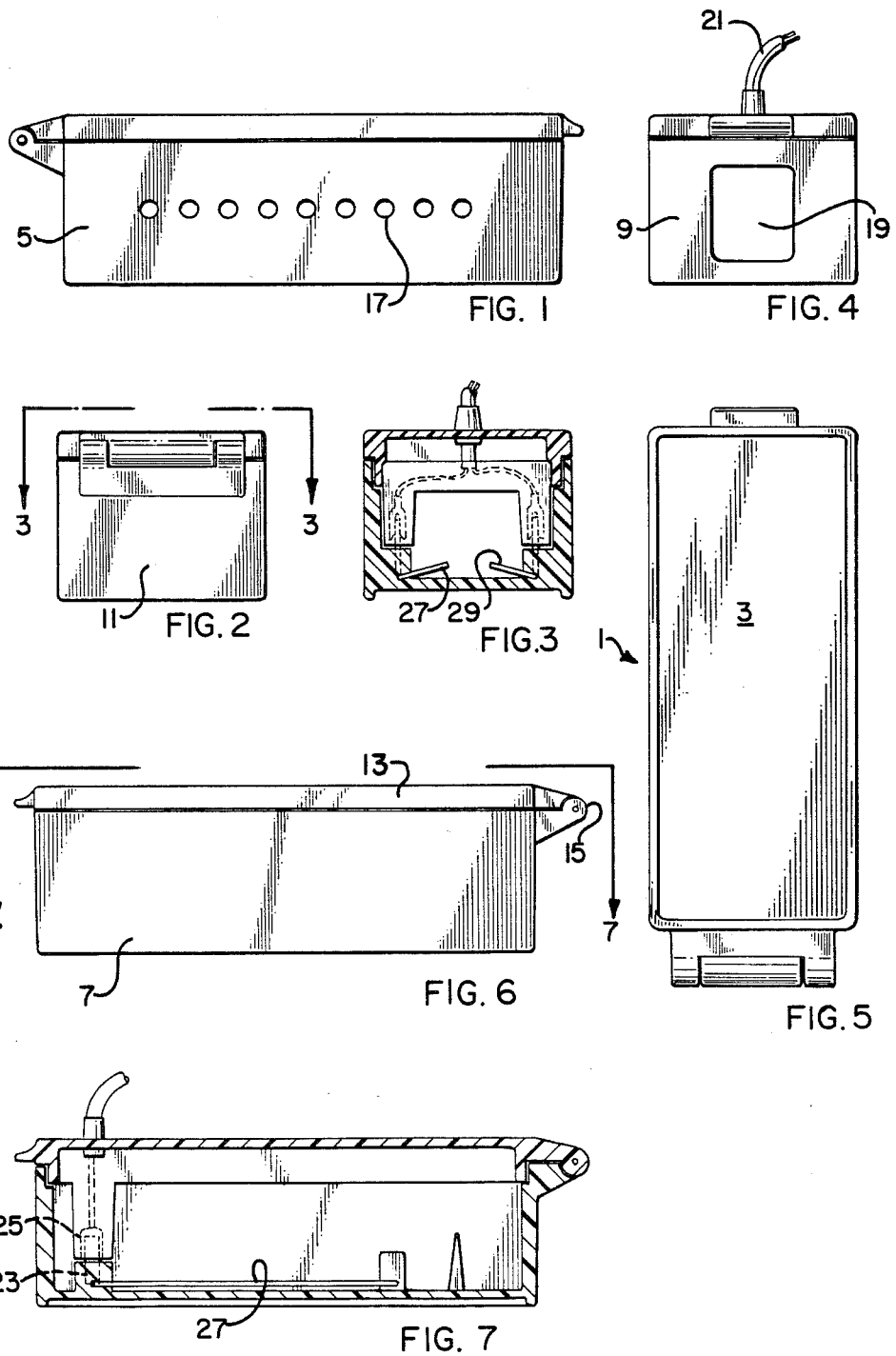

ELECTRIC MOUSE EXTERMINATOR

BACKGROUND OF THE INVENTION

1. Field of the Invention

This invention relates to mouse exterminators and, more specifically, to a trap containing electrocution apparatus therein.

2. Brief Description of the Prior Art

Electric mouse traps are known in the prior art. Examples of such prior art are Ratchford (U.S. Pat. No. 2,420,723), which discloses a box with convergent walls extending from an opening therein. The floor and metal strips in the wall are convergent whereby, when a mouse enters the opening between the walls and walks sufficiently far into the box to contact the metal strips, it will be electrocuted. A problem with this type of arrangement is that the mouse must be willing to walk into a pair of convergent walls before the trap can perform its function.

Other prior art which operates in the same or a similar manner for exterminating rodents are Kaiser (U.S. Pat. Nos. 1,899,199), Tidwell (4,074,456), Fitzgerald (4,497,130) as well as German Pat. No. 338,762.

None of the above noted prior art provides the simultaneous properties of providing a rodent trap wherein the rodent is readily attracted to the trap, is quickly and easily exterminated when in the trap and is easily removed from the trap after extermination.

SUMMARY OF THE INVENTION

In accordance with the present invention, the above noted problems of the prior art are minimized and there is provided a rodent exterminator which is capable of readily attracting rodents thereinto, is capable of quickly exterminating the rodent upon entry into the trap and is capable of easy removal of the exterminated rodent.

Briefly, in accordance with the present invention, there is provided a rodent exterminator which includes a box having a width dimension slightly larger than that of the largest rodent expected to enter thereinto with an opening at one end thereof for admission of the rodent. Wires extend from the box sidewalls into the box itself to contact any rodent entering into the box to exterminate such rodent. The box further includes a hinged top with the power supply line attached thereto for connection to the wires to provide power thereto. The power supply line is connected through a connector to the wires only when the top is closed. The box also includes small vent holes on one side to permit the odor of bait within the box to permeate to the exterior thereof.

It can be seen that a rodent will smell the aroma of the bait and enter the trap through the end opening whereupon the rodent will contact the wires and be exterminated within the trap. The exterminated rodent is removed from the trap by rotation of the trap top whereupon the electricity to the trap wires is cut off and the rodent is easily removed so that the trap can be reused.

BRIEF DESCRIPTION OF THE DRAWINGS

FIG. 1 is a left side view of the trap in accordance with the present invention as viewed facing the front of the trap;

FIG. 2 is a back view of the trap;

FIG. 3 is a cross-sectional view taken through the view of FIG. 2;

FIG. 4 is a front view of the trap;

FIG. 5 if a bottom view of the trap;

FIG. 6 is a right side view of the trap; and

FIG. 7 is a cross-sectional view taken through the view of FIG. 6.

DESCRIPTION OF THE PREFERRED EMBODIMENT

Referring now to the drawing, there is shown a box 1 having a floor 3, side walls 5 and 7 and end walls 9 and 11. The trap also includes a top 13 which is hinged to the end wall 11 by a hinge 15 and is rotatable about the hinge. The side wall 5 includes vent holes 17 therein to permit the aroma of bait disposed within the trap to permeate to the exterior thereof. The front end 9 includes an opening 19 therein to permit entry of a rodent into the trap interior.

The top 13 includes a source of power 21 which can be an electric line connected to a standard house electrical outlet. This line is secured to a female plug 25 in the top 15 which disconnectably mates with a male plug 23 secured at the side walls of the box, it being noted from FIG. 3 that there are two such plug pairs 23,25, one for each line of the wire 21. One of the male plugs 23 is coupled to a wire 27 on one side of the box interior and the other male plug is coupled to a wire 29 on the other side of the box interior, the wires 27 and 29 extending toward the box interior to insure contact with a rodent entering the box.

In operation, with the top 13 in the closed position, the plugs 23 and 25 will be mated to provide power to the wires 27 and 29. A rodent will smell the aroma of bait exiting the box or trap 1 through the holes 17 and be attracted thereto, entering the opening 19. Upon entry sufficiently into the box, the rodent will come in contact with the wires 27 and 29 to complete the circuit whereby the rodent is electrocuted. The operator of the trap will later rotate the top 13 about the hinge 15 to cut off the power to the wires 27 and 29 and permit the electrocuted rodent to be dropped out of the trap by merely rotating it 180 degrees as is readily apparent. The trap is now again ready for use by merely closing the top 13 so that power is again supplied to the wires 27 and 29.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

I claim:

1. A rodent exterminator which comprises, in combination:
   (a) a box having end and side walls,
   (b) an opening in only one of said end walls extending into the interior of said box,
   (c) a top pivotally to one of said walls
   (d) a single pair of electrocution wires disposed within said box, each said wire being adjacent and extending along said side walls on opposite sides of said opening and extending therealong toward the interior of said box,
   (e) means in said top for disconnectingly applying electrical power to said wires, each of said wires being coupled to said means when said top is closed; and (f) means disposed at the interior of said box and between said wires to mount bait to attract said rodent into said opening and entice said rodent to move between said wires.

2. A rodent exterminator as set forth in claim 1 further including holes in said walls for permitting air circulation between the box interior and the exterior thereof.

3. A rodent exterminator as set forth in claim 2 wherein said top includes pivot means disposed at the end of said box remote from said opening whereby said top rotates in a plane extending between said wires and normal to the plane including said wires.

4. A rodent exterminator as set forth in claim 2 wherein said means includes a female plug in said top connected to a source of power and a separate male plug secured to each of said wires and to the interior of said box for disconnectably mating with said female plug.

5. A rodent exterminator as set forth in claim 4 wherein said top includes pivot means disposed at the end of said box remote from said opening whereby said top rotates in a plane extending between said wires and normal to the plane including said wires.

6. A rodent exterminator as set forth in claim 1 wherein said means includes a female plug in said top connected to a source of power and a separate male plug secured to each of said wires and to the interior of said box for disconnectably mating with said female plug.

7. A rodent exterminator as set forth in claim 6 wherein said top includes pivot means disposed at the end of said box remote from said opening whereby said top rotates in a plane extending between said wires and normal to the plane including said wires.

8. A rodent exterminator as set forth in claim 1 wherein said top includes pivot means disposed at the end of said box remote from said opening whereby said top rotates in a plane extending between said wires and normal to the plane including said wires.

* * * * *